US008652007B2

(12) United States Patent  (10) Patent No.: US 8,652,007 B2
Kato et al.                (45) Date of Patent:     Feb. 18, 2014

(54) PRESSURE ACCUMULATION SYSTEM FOR INTERNAL COMBUSTION ENGINE

(75) Inventors: Kichiro Kato, Suntou-gun (JP); Keiji Yoeda, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 299 days.

(21) Appl. No.: 13/120,022

(22) PCT Filed: Dec. 11, 2008

(86) PCT No.: PCT/JP2008/072566
§ 371 (c)(1),
(2), (4) Date: Mar. 21, 2011

(87) PCT Pub. No.: WO2010/067447
PCT Pub. Date: Jun. 17, 2010

(65) Prior Publication Data
US 2011/0237392 A1    Sep. 29, 2011

(51) Int. Cl.
B60W 10/04    (2006.01)
B60W 10/10    (2012.01)

(52) U.S. Cl.
USPC .......................................... 477/110; 475/110

(58) Field of Classification Search
USPC ....................................................... 475/110
See application file for complete search history.

(56) References Cited

U.S. PATENT DOCUMENTS 5,836,152 A * 11/1998 Schatz ............................ 60/274
6,250,073 B1 * 6/2001 Zimmer et al. ................. 60/281
2002/0162530 A1  11/2002 Seitz et al.

FOREIGN PATENT DOCUMENTS

| EP | 0 531 277 A2 | 3/1993 |
|----|---|---|
| EP | 1 908 937 A1 | 4/2008 |
| JP | U-1-102437 | 7/1989 |
| JP | A-2002-339770 | 11/2002 |
| JP | A-2007-303393 | 11/2007 |
| JP | A-2007-315194 | 12/2007 |
| JP | A-2008-267170 | 11/2008 |
| WO | WO 2005/085611 A1 | 9/2005 |

OTHER PUBLICATIONS

International Search Report issued in International Application No. PCT/JP2008/072566 on Jan. 20, 2009 (with translation).

* cited by examiner

Primary Examiner — David D Le
Assistant Examiner — Colby M Hansen
(74) Attorney, Agent, or Firm — Oliff PLC

(57) ABSTRACT

A pressure accumulation system for an internal combustion engine can prevent exhaust pressure from excessively increasing when pressurized gas is contained in a pressure accumulation container. A pressure accumulation system is applied for an internal combustion engine provided with an exhaust shut-off valve mounted in an exhaust path. The pressure accumulation system has a pressure accumulation tank into which gas can be introduced from that portion of an exhaust path. The pressure accumulation system also has a sensor for detecting the exhaust pressure, and an EGR valve is controlled based on the detection value from the exhaust gas sensor such that the pressure in that portion of the exhaust path which is on the upstream of the exhaust shut-off valve is limited below a predetermined exhaust gas upper limit value (Pmax) when gas is contained in the pressure accumulation tank.

9 Claims, 8 Drawing Sheets

FIG.7

| GEAR STEP | FIRST | SECOND | THIRD | FOURTH | FIFTH |
|---|---|---|---|---|---|
| EXHAUST PRESSURE UPPER LIMIT VALUE Pmax | P0 | P1 | P2 | P3 | P4 |

( P0 < P1 < P2 < P3 < P4 )

PRESSURE ACCUMULATION SYSTEM FOR INTERNAL COMBUSTION ENGINE

TECHNICAL FIELD

The present invention relates to a pressure accumulation system for internal combustion engine, including a pressure accumulation container which can introduce gas from an exhaust path, supply the gas to the exhaust path, and accumulate a pressurized gas therein.

BACKGROUND ART

There is known a Diesel engine with turbocharger, in which an exhaust shutter is provided in the exhaust path in order to apply engine brake. In supercharging pressure control apparatuses applied to such the engine, there is known a supercharging pressure control apparatus including a pressure container connected to the exhaust path between the exhaust shutter and an exhaust valve. In the supercharging pressure control apparatus, an exhaust pressure is accumulated in the pressure container when the exhaust shutter is closed to increase the exhaust pressure, and the exhaust pressure injected from the pressure container when a turbine of the turbocharger needs to be accelerated (see Patent Document 1). In addition, there are Patent Documents 2 and 3 as prior art references in relation to the present invention.

CITATION LIST

Patent Literature

Patent Document 1: JP-U-01-102437
Patent Document 2: WO 2005/085611
Patent Document 3: JP-A-2007-315194

SUMMARY OF THE INVENTION

Technical Problem

In the apparatus of Patent Document 1, the exhaust shutter is closed to increase the exhaust pressure when the pressurized gas is accumulated in the pressure accumulation container. However, at this point, possibly the gas leaks to the outside from a sealing portion of an exhaust system between a stem portion of the exhaust valve and a cylinder head, when the exhaust pressure excessively increases. When the exhaust pressure excessively increases, the engine brake is excessively generated to rapidly reduce an engine rotation speed, and possibly the vehicle is suddenly decelerated.

In view of the foregoing, one object of the present invention is to provide a pressure accumulation system for an internal combustion engine, which can prevent the excessively high exhaust pressure in accumulating the pressurized gas in the pressure accumulation container.

Solution to Problem

In the first aspect of the present invention, there is provided a pressure accumulation system for an internal combustion engine, which is applied to an internal combustion engine in which an exhaust shut-off valve is provided in an exhaust path, the exhaust shut-off valve being able to switch between a fully-closed position where the exhaust path is closed and a fully-opened position where the exhaust path is opened, the pressure accumulation system for an internal combustion engine including a pressure accumulation container in which a pressurized gas can be accumulated, the pressure accumulation container being able to introduce gas from the exhaust path on an upstream side of the exhaust shut-off valve, the pressure accumulation container being able to supply the gas to the exhaust path on the upstream side of the exhaust shut-off valve, the pressurized gas being accumulated in the pressure accumulation container by increasing a pressure in the exhaust path on the upstream side of the exhaust shut-off valve, the pressure accumulation system for an internal combustion engine comprising: a pressure obtaining device for obtaining the pressure in the exhaust path on the upstream side of the exhaust shut-off valve or a pressure in the pressure accumulation container; a pressure adjustment device for being able to adjust the pressure in the exhaust path on the upstream side of the exhaust shut-off valve; and a control device for controlling an operation of the pressure adjustment device based on the pressure obtained by the pressure obtaining device such that the pressure in the exhaust path on the upstream side of the exhaust shut-off valve is restricted to a prescribed exhaust pressure upper limit value or less when the gas is accumulated in the pressure accumulation container.

According to the pressure accumulation system for an internal combustion engine of the first aspect according to the present invention, in accumulating the gas in the pressure accumulation container, the pressure (hereinafter sometimes referred to as an exhaust pressure) in the exhaust path on the upstream side of the exhaust shut-off valve is restricted to the prescribed exhaust pressure upper limit value or less. Therefore, the excessively high exhaust pressure can be prevented in accumulating the pressurized gas in the pressure accumulation container. Accordingly, the gas leakage from the sealing portion of the exhaust system and the rapid reduction of the engine rotation speed can securely be prevented by appropriately setting the exhaust pressure upper limit value according to the internal combustion engine.

In one embodiment of the pressure accumulation system for an internal combustion engine of the first aspect according to the present invention, the control device may first increase the pressure in the exhaust path on the upstream side of the exhaust shut-off valve to the exhaust pressure upper limit value when the gas is accumulated in the pressure accumulation container, and the control device controls the operation of the pressure adjustment device such that the pressure in the exhaust path on the upstream side of the exhaust shut-off valve changes within a prescribed pressure range whose upper limit value is the exhaust pressure upper limit value. In this case, the exhaust pressure first increases to the exhaust pressure upper limit value, so that the exhaust pressure can quickly increase. Therefore, the pressurized gas can quickly be accumulated in the pressure accumulation container.

In this embodiment, the gas may be accumulated in the pressure accumulation container until a pressure in the pressure accumulation container reaches a prescribed target pressure, and a value that is lower than the exhaust pressure upper limit value and is greater than or equal to the target pressure may be set to a lower limit value of the prescribed pressure range. In this case, the exhaust pressure can be prevented from becoming lower than the target pressure when the gas is accumulated in the pressure accumulation container. Therefore, the pressurized gas can quickly be accumulated in the pressure accumulation container.

In one embodiment of the pressure accumulation system for an internal combustion engine of the first aspect according to the present invention, when the pressure in the exhaust path on the upstream side of the exhaust shut-off valve is adjusted, the control device may control the operation of the pressure adjustment device such that a variation of the pressure per unit time becomes a prescribed permissible value or less. When the exhaust pressure rapidly changes during the closed state of the exhaust shut-off valve, engine brake effect rapidly changes, which possibly generating the rapid change in rotation speed of the internal combustion engine. In this embodiment, the variation of the exhaust pressure per unit time is suppressed to the permissible value or less, so that the rapid change in the exhaust pressure can be prevented by properly setting the permissible value. Therefore, the rapid change in the engine brake effect can be suppressed to suppress the rapid change in the rotation speed of the internal combustion engine.

In one embodiment of the pressure accumulation system for an internal combustion engine of the first aspect according to the present invention, the internal combustion engine may include an exhaust gas recirculation (EGR) path that connects the exhaust path on the upstream side of the exhaust shut-off valve and an intake path of the internal combustion engine; and an exhaust gas recirculation (EGR) valve that opens and closes the EGR path, and the pressure adjustment device may be the EGR valve. The gas in the exhaust path on the upstream side of the exhaust shut-off valve can be discharged to the intake path by opening the EGR valve. Therefore, the exhaust pressure can be adjusted.

In this embodiment, the control device gradually may control the EGR valve to a closed side according to the decrease in the pressure obtained by the pressure obtaining device. By controlling the EGR valve in the above-described way, the exhaust pressure hardly decreases when the gas is accumulated in the pressure accumulation container. Therefore, the pressurized gas can quickly be accumulated in the pressure accumulation container.

In one embodiment of the pressure accumulation system for an internal combustion engine of the first aspect according to the present invention, an opening degree of the exhaust shut-off valve can change between the fully-closed position and the fully-opened position, and the pressure adjustment device may be the exhaust shut-off valve. The exhaust pressure can be adjusted, because the gas in the exhaust path on the upstream side of the exhaust shut-off valve can be discharged to the downstream side of the exhaust shut-off valve by opening the exhaust shut-off valve.

In this embodiment, the control device gradually may control the exhaust shut-off valve to a closed side according to the decrease in the pressure obtained by the pressure obtaining device. In this case, the pressurized gas can quickly be accumulated in the pressure accumulation container, because the exhaust pressure hardly decreases when the gas is accumulated in the pressure accumulation container.

In one embodiment of the pressure accumulation system for an internal combustion engine of the first aspect according to the present invention, further includes a bypass path that connects the exhaust path on the upstream side of the exhaust shut-off valve and the exhaust path on the downstream side of the exhaust shut-off valve; and a bypass valve that opens and closes the bypass path, wherein the pressure adjustment device may be the bypass valve. In this case, the exhaust pressure can be adjusted, because the gas in the exhaust path on the upstream side of the exhaust shut-off valve can be discharged to the downstream side of the exhaust shut-off valve by opening the bypass valve.

In this embodiment, the control device gradually may control the bypass valve to a closed side according to the decrease in the pressure obtained by the pressure obtaining device. In this case, the pressurized gas can quickly be accumulated in the pressure accumulation container, because the exhaust pressure hardly decreases when the gas is accumulated in the pressure accumulation container.

In one embodiment of the pressure accumulation system for an internal combustion engine of the first aspect according to the present invention, the internal combustion engine may be mounted on a vehicle, a transmission that may be provided in a power transmission path between the internal combustion engine and a drive wheel of the vehicle may be connected to an output shaft of the internal combustion engine, the transmission being able to switch among a plurality of transmission gear ratios having different values, and the control device may include upper limit value setting device for setting the exhaust pressure upper limit value to a higher value as a speed of the vehicle increases or as the transmission gear ratio decreases in the transmission. When the vehicle runs at an identical speed, as a transmission gear ratio of a transmission decreases, a torque necessary for the internal combustion engine increases to reduce the rotation speed of the internal combustion engine. Therefore, as the transmission gear ratio of the transmission decreases, it can be estimated that the amount of gas discharged from the cylinder to the exhaust path decreases to decrease the exhaust pressure. Accordingly, as the transmission gear ratio of the transmission decreases, the engine brake effect is weakened when the exhaust shut-off valve is switched to the fully-closed state, and the vehicle deceleration decreases. That is, for the small transmission gear ratio, even if the exhaust pressure upper limit value is increased compared with the large transmission gear ratio, the rapid reduction of the rotation speed of the internal combustion engine is hardly generated. Therefore, as the transmission gear ratio of the transmission decreases, the exhaust pressure upper limit value can be set to a higher value. In general, with increasing vehicle speed, the transmission gear ratio of the transmission is switched to the small gear ratio. Therefore, with increasing vehicle speed, the exhaust pressure upper limit value can be set to the higher value. The exhaust pressure upper limit value is set in the above-described way, which allows the pressurized gas to be quickly accumulated in the pressure accumulation container while the sudden vehicle deceleration caused by the rapid reduction of the rotation speed of the internal combustion engine is prevented.

In the second aspect of the present invention, there is provided a pressure accumulation system for an internal combustion engine, which is applied to an internal combustion engine in which an exhaust shut-off valve is provided in an exhaust path, the exhaust shut-off valve being able to switch between a fully-closed position where the exhaust path is closed and a fully-opened position where the exhaust path is opened, the pressure accumulation system for an internal combustion engine including a pressure accumulation container in which a pressurized gas can be accumulated, the pressure accumulation container being able to introduce gas from the exhaust path on an upstream side of the exhaust shut-off valve, the pressure accumulation container being able to supply the gas to the exhaust path on the upstream side of the exhaust shut-off valve, the pressurized gas being accumulated in the pressure accumulation container by increasing a pressure in the exhaust path on the upstream side of the exhaust shut-off valve, the pressure accumulation system for an internal combustion engine comprising a relief valve that is opened such that the gas is discharged from the exhaust path on the upstream side of the exhaust shut-off valve when the pressure in the exhaust path on the upstream side of the exhaust shut-off valve or a pressure in the pressure accumulation container reaches a prescribed exhaust pressure upper limit value.

According to the pressure accumulation system for an internal combustion engine of the second aspect according to the present invention, the relief valve is opened when the pressure (exhaust pressure) in the exhaust path on the upstream side of the exhaust shut-off valve reaches the exhaust pressure upper limit value, so that the exhaust pressure can be restricted to the exhaust pressure upper limit value or less. Therefore, the excessively high exhaust pressure can be prevented when the pressurized gas is accumulated in the pressure accumulation container.

BRIEF DESCRIPTION OF DRAWINGS

FIG. 7 is a view showing an example of relations between a gear step of a transmission and an exhaust pressure upper limit value.

DESCRIPTION OF EMBODIMENTS (First Embodiment)

Figure 1:
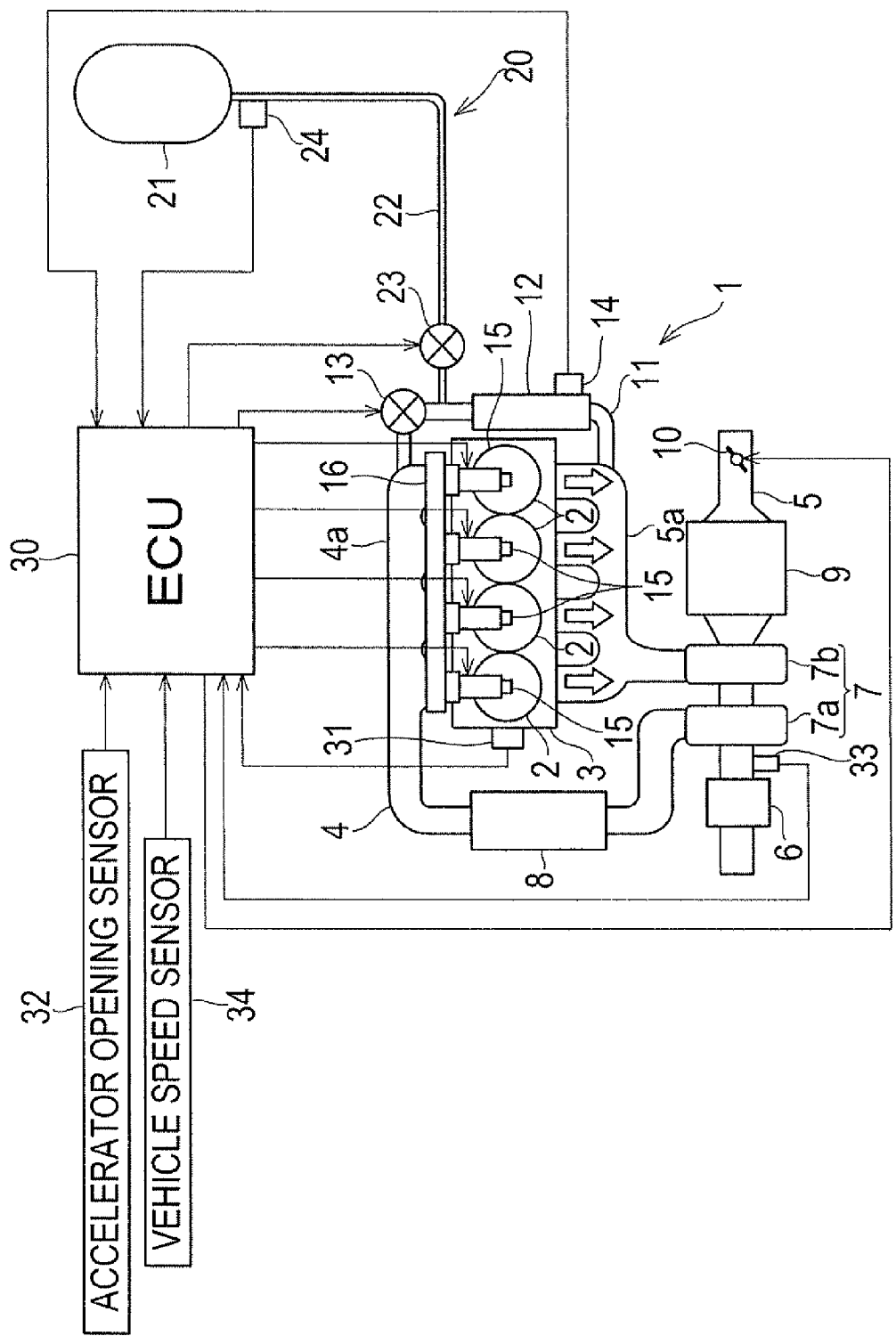
FIG. 1 is a view showing an internal combustion engine in which a pressure accumulation system according to a first embodiment of the present invention is incorporated.

FIG. 1 shows an internal combustion engine in which a pressure accumulation system according to a first embodiment of the present invention is incorporated. The internal combustion engine (hereinafter referred to as an engine) 1 of FIG. 1 is a Diesel engine that is mounted on a vehicle as a traveling power source. The engine 1 includes an engine body 3, an intake path 4, and an exhaust path 5. The engine body 3 includes plural (four in FIG. 1) cylinders 2. The intake path 4 and the exhaust path 5 are connected to each of the cylinders 2. The intake path 4 is provided with an air cleaner 6 that filters intake air, a compressor 7a of a turbocharger 7, and an intercooler 8 that cools the intake air. The exhaust path 5 is provided with a turbine 7b of the turbocharger 7, a catalytic converter 9 that purifies exhaust gas, and an exhaust shut-off valve 10. The exhaust shut-off valve 10 can switch between a fully-closed position where the exhaust path 5 is closed and a fully-opened position where the exhaust path 5 is opened.

The exhaust path 5 and the intake path 4 are connected by an exhaust gas recirculation (EGR) path 11. As shown in FIG. 1, the EGR path 11 connects an exhaust manifold 5a that constitutes part of the exhaust path 5 and an intake manifold 4a that constitutes part of the intake path 4. The EGR path 11 is provided with an exhaust gas recirculation (EGR) cooler 12 and an exhaust gas recirculation (EGR) valve 13. The EGR cooler 12 cools the exhaust gas (hereinafter referred to as exhaust gas recirculation (EGR) gas) that is introduced from the exhaust path 5 to the intake path 4. The EGR valve 13 adjusts a flow rate of the EGR gas. The EGR cooler 12 is provided nearer a side of the exhaust path 5 than a side of the EGR valve 13. The EGR cooler 12 is provided with an exhaust pressure sensor 14 serving as a pressure obtaining device. The exhaust pressure sensor 14 outputs a signal corresponding to a pressure (hereinafter referred to as an exhaust pressure) Pe of an exhaust gas of the EGR path 11. An injector 15 is provided in each cylinder 2 in order to inject fuel in the cylinder 2. A common rail 16 is connected to each injector 15 to accumulate high-pressure fuel supplied to the injector 15.

As shown in FIG. 1, the engine 1 includes a pressure accumulation system 20 that assists an operation of the turbocharger 7. The pressure accumulation system 20 includes a pressure accumulation tank 21 serving as a pressure accumulation container. The pressure accumulation tank 21 is configured as a pressure container in which a pressurized gas can be accumulated. At least one of air and exhaust gas is accumulated as the gas in the pressure accumulation tank 21.

The pressure accumulation tank 21 is connected to the EGR path 11 by a gas path 22. As shown in FIG. 1, the gas path 22 connects the EGR path 11 located nearer the side of the exhaust path 5 than the EGR valve 13 and the pressure accumulation tank 21. The gas path 22 is provided with a flow control valve 23. The flow control valve 23 can adjust an opening degree between a connection position and a shut-off position. In the connection position (hereinafter referred to as a fully-opened position), the gas path 22 is fully opened such that the inside of the pressure accumulation tank 21 and the EGR path 11 are connected. In the shut-off position (hereinafter referred to as a fully-closed position), the gas path 22 is fully closed such that the connection between the inside of the pressure accumulation tank 21 and the EGR path 11 is shut off. A pressure sensor 24 is provided in the gas path 22 located nearer the side of the pressure accumulation tank 21 than the flow control valve 23, and the pressure sensor 24 outputs a signal corresponding to a pressure (hereinafter referred to as a tank pressure) in the pressure accumulation tank 21.

The operation of the flow control valve 23 is controlled by an Engine Control Unit (ECU) 30. The ECU is a well-known computer unit that includes a microprocessor and peripheral devices, such as a RAM and a ROM, which are necessary for the operation of the microprocessor. The ECU 30 controls operations of the exhaust shut-off valve 10, EGR valve 13, and injector 15 based on output signals from various sensors provided in the engine 1, thereby controlling an operating state of the engine 1. For example, when a rotation speed of the engine 1 is greater than or equal to a prescribed fuel cut rotation speed while an accelerator opening degree is 0%, that is, an accelerator pedal is not pressed down, the ECU 30 controls the operation of each injector 15 such that fuel supply to each cylinder 2 is stopped. Hereinafter, this control is referred to as fuel cut control. The ECU 30 adjusts the opening degree of the EGR valve 13 such that a proper amount of EGR gas is introduced to the intake path according to the operating state of the engine 1. Additionally, the ECU 30 adjusts the opening degree of the exhaust shut-off valve 10 according to the operating state of the engine 1. As sensors referred in executing the above control, the ECU 30 is connected to a crank angle sensor 31, an accelerator opening sensor 32, an air-flow meter 33, a vehicle speed sensor 34 and the like. The crank angle sensor 31 outputs a signal corresponding to a rotation speed of a crankshaft of the engine 1. The accelerator opening sensor 32 outputs a signal corresponding to the accelerator opening degree. The air-flow meter 33 outputs a signal corresponding to an intake air amount. The vehicle speed sensor 34 outputs a signal corresponding to the vehicle speed. The ECU 30 is also connected to the exhaust pressure sensor 14 and the pressure sensor 24. In addition to the above sensors, various sensors are further connected to the ECU 30, but they are omitted in the figure.

The ECU 30 controls the pressure accumulation system 20 according to a running state of the vehicle and the operating state of the engine 1. For example, when the necessity of assisting the operation of the turbocharger 7 is generated, the ECU 30 controls the pressure accumulation system 20 such that the gas accumulated in the pressure accumulation tank 21 is supplied to a turbine 7b. Specifically, the ECU 30 first controls the EGR valve 13 to be fully closed, and switches the flow control valve 23 to the fully-opened position. Accordingly, the gas in the pressure accumulation tank 21 is supplied to the turbine 7b via the gas path 22, the EGR path 11, and the exhaust manifold 5a. Therefore, the operation of the turbocharger 7 can be assisted by the gas.

Figure 2:
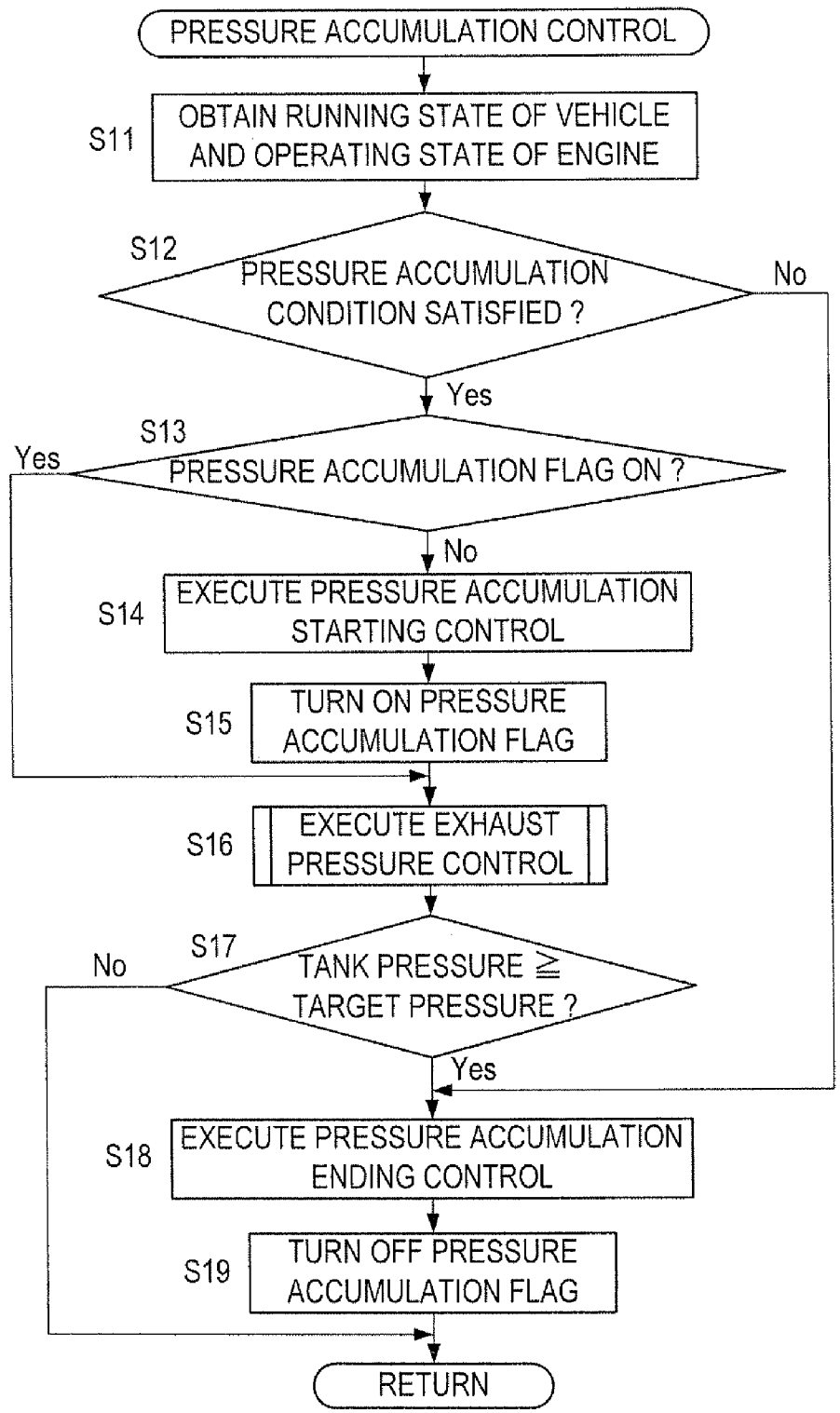
FIG. 2 is a flowchart showing a pressure accumulation control routine executed by an ECU in FIG. 1.

Furthermore, when the fuel cut control is performed, the ECU 30 controls the pressure accumulation system 20 such that the pressurized gas is accumulated in the pressure accumulation tank 21 in order to assist the operation of the turbocharger 7. At this point, the ECU 30 accumulates the gas in the pressure accumulation tank 21 until a tank pressure reaches a predetermined target pressure. For example, the target pressure is set in such a pressure that can sufficiently accelerate the turbine 7b by supplying the gas having the pressure to the exhaust path 5. FIG. 2 shows a pressure accumulation control routine executed by ECU 30 repeatedly at predetermined intervals during operation of the engine 1 in order to accumulate the pressurized gas in the pressure accumulation tank 21.

In the control routine of FIG. 2, the ECU 30 first obtains the running state of the vehicle and the operating state of the engine 1 in Step S11. For example, the ECU 30 obtains the vehicle speed as the running state of the vehicle. For example, the ECU 30 obtains the rotation speed, accelerator opening degree, exhaust pressure Pe, intake air amount, and tank pressure of the engine 1 as the operating state of the engine 1. In Step S12, the ECU determines whether or not a prescribed pressure accumulation condition is satisfied. It is determined that the pressure accumulation condition is satisfied, when the fuel cut control is performed to the engine 1 and the tank pressure is equal to or lower than a pressure at which the operation of the turbocharger 7 can be assisted. When the ECU 30 determines that the pressure accumulation condition is not satisfied, the ECU 30 skips the processes in Steps S13 to S17 and goes to Step S18.

On the other hand, when the ECU 30 determines that the pressure accumulation condition is satisfied, the ECU 30 goes to Step S13 and determines whether or not a pressure accumulation flag is in an ON state. The pressure accumulation flag indicates the middle of the accumulation of the pressurized gas in the pressure accumulation tank 21, that is, the middle of the pressure accumulation. When the ECU 30 determined that the pressure accumulation flag is in the ON state, the ECU 30 skips the processes in Steps S14 and S15 and goes to Step S16. On the other hand, when the ECU 30 determined that the pressure accumulation flag is in an OFF state, the ECU 30 goes to Step S14 and executes a pressure accumulation starting control in order to accumulate the pressurized gas in the pressure accumulation tank 21. In the pressure accumulation starting control, the ECU 30 first switches the exhaust shut-off valve 10 and the EGR valve 13 to the fully-closed state. Then the ECU 30 switches the flow control valve 23 to the fully-opened state. Therefore, the gas in the exhaust path 5 on the upstream side of the exhaust shut-off valve 10 is pressurized and is accumulated in the pressure accumulation tank 21. Because the fuel cut control is being performed when the pressure accumulation condition is satisfied, air is discharged from the cylinder 2 to the exhaust path 5. Therefore, the gas accumulated in the pressure accumulation tank 21 is almost air. In Step S15, the ECU 30 turns on the pressure accumulation flag.

In next Step S16, the ECU 30 executes an exhaust pressure control. During the pressure accumulation in the pressure accumulation tank 21, because the exhaust shut-off valve 10 and the EGR valve 13 are fully closed, the pressure increases in the exhaust path 5 on the upstream side of the exhaust shut-off valve 10. At this point, if the pressure excessively increases, for example, possibly the gas leaks to the outside from a sealing portion provided in the exhaust path 5 on the upstream side of the exhaust shut-off valve 10 or the rotation speed of the engine 1 is reduced due to the excessive engine brake. Therefore, the ECU 30 adjusts the pressure in the exhaust path 5 on the upstream side of the exhaust shut-off valve 10 by adjusting the opening degree of the EGR valve 13 in order to prevent the gas leakage and the rapid reduction of the engine rotation speed. When the exhaust shut-off valve 10 and the EGR valve 13 are fully closed, the pressure in the exhaust path 5 on the upstream side of the exhaust shut-off valve 10 becomes equal to the pressure in the EGR path 11. Hereinafter, the pressure in the exhaust path 5 on the upstream side of the exhaust shut-off valve 10 during the pressure accumulation in the pressure accumulation tank 21 is referred to as an exhaust pressure Pe.

Figure 3:
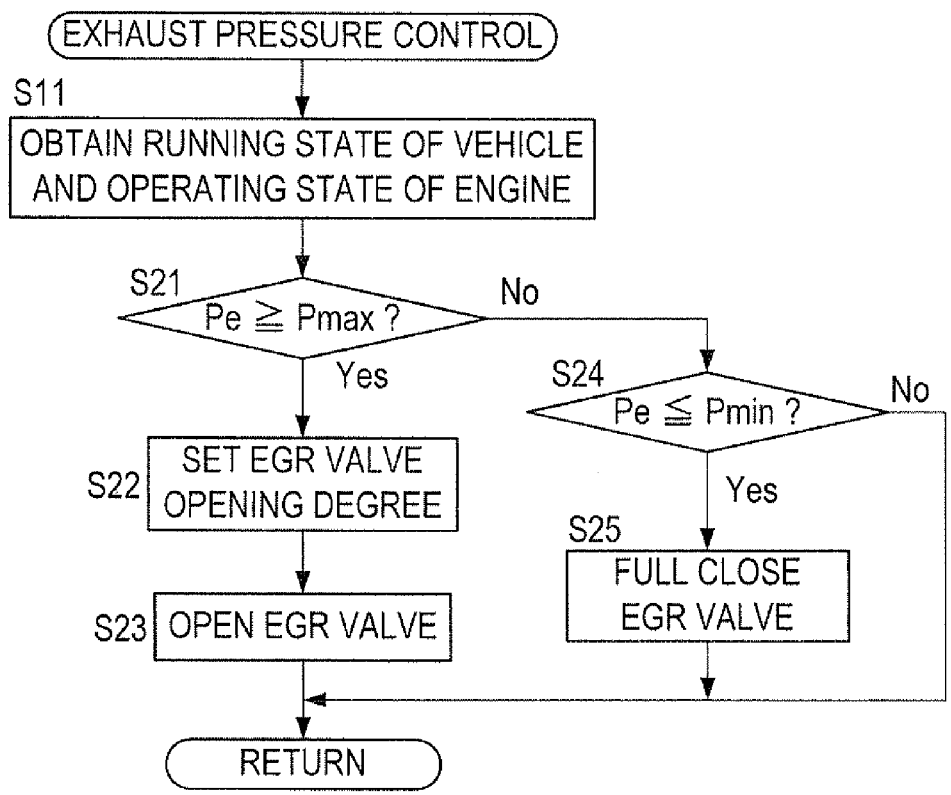
FIG. 3 is a flowchart showing an exhaust pressure control routine executed by an ECU in FIG. 1.

FIG. 3 shows an exhaust pressure control routine executed by the ECU 30 in order to adjust the exhaust pressure Pe during the pressure accumulation in the pressure accumulation tank 21. The control routine of FIG. 3 is executed in Step S16 of FIG. 2. The same processes in FIG. 3 as those in FIG. 2 have same reference numeral, and their description will be omitted. By executing this control routine, the ECU 30 functions as a control device of the present invention.

In the control routine of FIG. 3, the ECU 30 first obtains the running state of the vehicle and the operating state of the engine 1 in Step S11. In next Step S21, the ECU 30 determines whether or not the exhaust pressure Pe is greater than or equal to a prescribed exhaust pressure upper limit value Pmax. The exhaust pressure upper limit value Pmax is a threshold that is set in order to prevent the gas leakage and the rapid reduction of the engine rotation speed during the pressure accumulation in the pressure accumulation tank 21. For example, the exhaust pressure upper limit value Pmax is set based on a pressure value at the beginning of the gas leakage to the outside from the sealing portion provided in the exhaust path 5 on the upstream side of the exhaust shut-off valve 10 and a pressure value at which the rapid vehicle deceleration caused by the engine brake can be prevented. The exhaust pressure upper limit value Pmax is set a pressure value lower than the above-described pressure value. Moreover, the exhaust pressure upper limit value Pmax is set a pressure value higher than the target pressure of the pressure accumulation tank 21.

Figure 4:
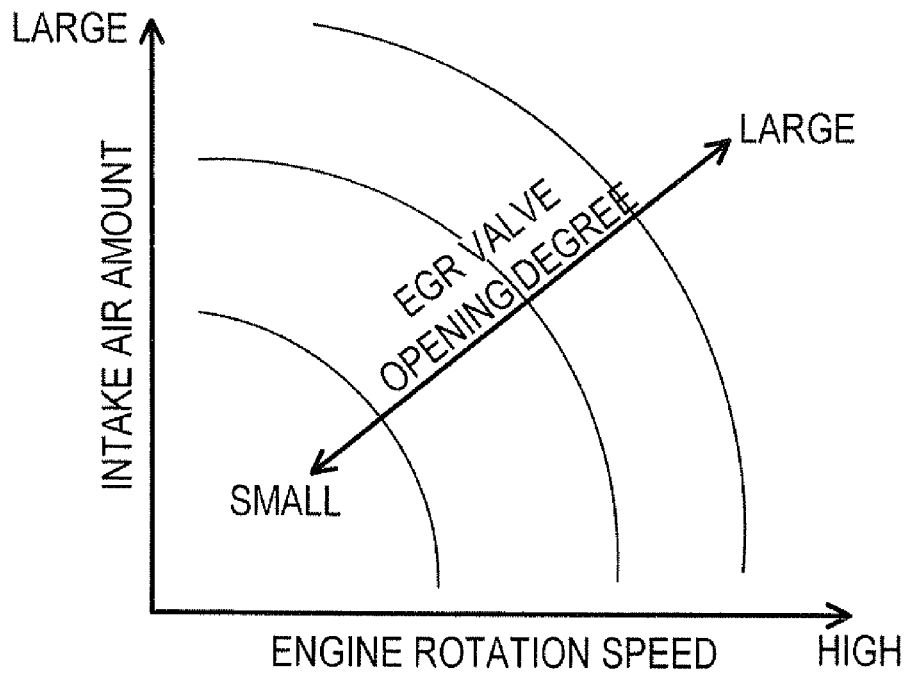
FIG. 4 is a view showing an example of relations between a rotation speed and an intake air amount of an engine and an opening degree of an EGR valve.

When the ECU 30 determined that the exhaust pressure Pe is greater than or equal to the exhaust pressure upper limit value Pmax, the ECU 30 goes to Step S22 and sets the opening degree of the EGR valve 13. For example, the opening degree of the EGR valve 13 is set by referring to a map that is shown in FIG. 4. FIG. 4 shows an example of relations between the rotation speed and intake air amount of the engine 1 and the opening degree of the EGR valve 13. The amount of gas discharged from the cylinder 2 to the exhaust path 5 changes according to the operating state of the engine 1. The amount of gas increases, as the rotation speed of the engine 1 increases or as the intake air amount increases. In order to decrease the exhaust pressure Pe, it is necessary to largely open the EGR valve 13 as the rotation speed of the engine 1 increases or as the intake air amount increases. Therefore, the opening degree of the EGR valve 13 is set larger as the rotation speed of the engine 1 increases or as the intake air amount increases. The relations shown in FIG. 4 may be obtained in advance through experiments or the like and stored in the RAM of the ECU 30. In Step S23, the ECU 30 opens the EGR valve 13 to the set opening degree. Thereafter, the ECU 30 ends the current control routine. In opening the EGR valve 13, the ECU 30 controls the opening degree of the EGR valve 13 such that the exhaust pressure Pe does not rapidly decreases. Specifically, the ECU 30 opens the EGR valve 13 such that a variation of pressure per unit time is lower than or equal to a prescribed permissible value. When the opening degree of the EGR valve 13 is changed, the variation of the exhaust pressure Pe per unit time depends on a volume of the exhaust path 5 on the upstream side of the exhaust shut-off valve 10 and the like. Therefore, for example, the prescribed permissible value may appropriately be set according to the volume of the exhaust path 5 on the upstream side of the exhaust shut-off valve 10.

On the other hand, when the ECU 30 determined that the exhaust pressure Pe is lower than the exhaust pressure upper limit value Pmax, the ECU 30 goes to Step S24 and determines whether or not the exhaust pressure Pe is equal to or lower than a prescribed exhaust pressure lower limit value Pmin. In order to accumulate the gas in the pressure accumulation tank 21 to the target pressure, it is necessary that the pressure (exhaust pressure Pe) in the exhaust path 5 on the upstream side of the exhaust shut-off valve 10 be increased not lower than the target pressure. The exhaust pressure lower limit value Pmin is a lower limit value of the pressure necessary to accumulate the gas in the pressure accumulation tank 21 to the target pressure. For example, the exhaust pressure lower limit value Pmin is set to the target pressure. When the ECU 30 determined that the exhaust pressure Pe is more than the exhaust pressure lower limit value Pmin, the ECU 30 ends the current control routine. On the other hand, when the ECU 30 determined that the exhaust pressure Pe is equal to or lower than the exhaust pressure lower limit value Pmin, the ECU 30 goes to Step S25 and fully closes the EGR valve 13. If the EGR valve 13 has been already fully closed, the EGR valve 13 is maintained in that state. Thereafter, the ECU 30 ends the current control routine. Thus, the EGR valve 13 functions a pressure adjustment device of the present invention by controlling the opening degree of the EGR valve 13 to adjust the exhaust pressure Pe.

Returning to FIG. 2, the description of the pressure accumulation control will be continued. After the exhaust pressure control in Step S16 is ended, the ECU 30 goes to Step S17 and determines whether or not the tank pressure is greater than or equal to the target pressure. When the ECU 30 determined that the tank pressure is lower than the target pressure, the ECU 30 ends the current control routine. On the other hand, when the ECU 30 determined that the tank pressure is greater than or equal to the target pressure, or when Step S12 is determined negatively, the ECU 30 goes to Step S18 and executes a pressure accumulation ending control. In the pressure accumulation ending control, the ECU 30 first switches the flow control valve 23 to the fully-closed state, thereby ending the pressure accumulation in the pressure accumulation tank 21. Next, the ECU 30 temporarily fully opens the exhaust shut-off valve 10 and the EGR valve 13 to decrease the exhaust pressure Pe. Then the ECU 30 switches the control of the exhaust shut-off valve 10 and EGR valve 13 to normal control in which the valve opening degree is controlled according to the operating state of the engine 1 In Step S19, the ECU 30 turns off the pressure accumulation flag. Thereafter, the ECU 30 ends the current control routine.

Figure 5:
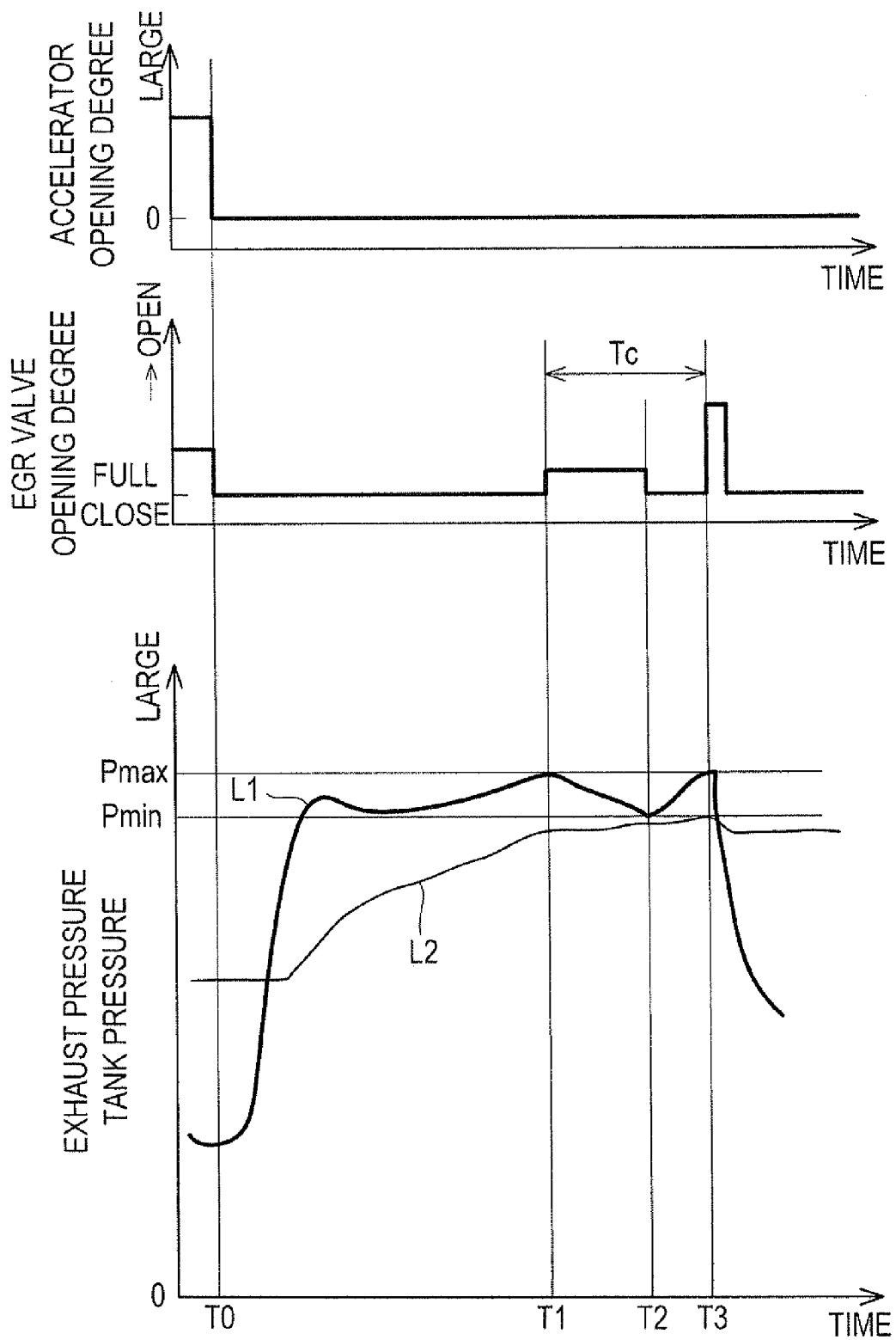
FIG. 5 is a view showing an example of time changes of an accelerator opening degree, the EGR valve opening degree, an exhaust pressure, and a tank pressure when the pressure accumulation control routine of FIG. 2 is executed to perform pressure accumulation in a pressure accumulation tank.

FIG. 5 is a view showing an example of time changes of the accelerator opening degree, the opening degree of the EGR valve 13, the exhaust pressure Pe, and the tank pressure when the pressure accumulation control routine of FIG. 2 is executed to perform the pressure accumulation in the pressure accumulation tank 21. A solid line L1 of FIG. 5 indicates the time change of the exhaust pressure Pe, and a solid line L2 indicates the time change of the tank pressure. As shown in FIG. 5, when the accelerator opening degree becomes 0% at a time T0 and when the pressure accumulation condition is satisfied, the EGR valve 13 is fully closed, thereby starting the increase in exhaust pressure Pe. When the exhaust pressure Pe reaches the exhaust pressure upper limit value Pmax at a time T1, the EGR valve 13 is opened, thereby starting the decrease in exhaust pressure Pe. When the exhaust pressure Pe decreases to the exhaust pressure lower limit value Pmin at a time T2, the EGR valve 13 is fully closed, thereby restarting the increase in exhaust pressure Pe. When the tank pressure reaches the target pressure at a time T3, the pressure accumulation ending control is executed to temporarily fully close the EGR valve 13. Then the control of the EGR valve 13 is returned to the normal control. In FIG. 5, the EGR valve 13 is controlled so as to be fully closed in the normal control. In FIG. 5, in a period Tc of times T1 to T3, the exhaust pressure Pe is adjusted between the exhaust pressure upper limit value Pmax and the exhaust pressure lower limit value Pmin.

According to the pressure accumulation system 20 of the first embodiment, the exhaust pressure Pe is restricted to the exhaust pressure upper limit value Pmax or less during the pressure accumulation in the pressure accumulation tank 21, so that the excessively high exhaust pressure Pe can be prevented. Therefore, the gas leakage from the sealing portion provided in the exhaust path 5 on the upstream side of the exhaust shut-off valve 10 and the rapid reduction of the rotation speed of the engine 1 can securely be prevented.

The exhaust pressure Pe first increases to the exhaust pressure upper limit value Pmax in accumulating the pressurized gas in the pressure accumulation tank 21, so that the pressurized gas can quickly be accumulated in the pressure accumulation tank 21. After the exhaust pressure Pe increases to the exhaust pressure upper limit value Pmax, as shown in FIG. 5, the opening degree of the EGR valve 13 is adjusted such that the exhaust pressure Pe changes within a pressure range between the exhaust pressure upper limit value Pmax and the exhaust pressure lower limit value Pmin. Therefore, the pressurized gas can further quickly be accumulated in the pressure accumulation tank 21.

In adjusting the exhaust pressure Pe, the opening degree of the EGR valve 13 is adjusted such that the variation of the exhaust pressure Pe per unit time becomes the prescribed permissible value or less, so that the rapid decrease in the exhaust pressure Pe can be controlled. Therefore, the rapid change in the rotation speed of the engine 1 can be controlled.

The exhaust pressure upper limit value Pmax and the exhaust pressure lower limit value Pmin are not limited to the above-described values. For example, the exhaust pressure lower limit value Pmin may be set to a value higher than the target pressure of the pressure accumulation tank 21. Thus, during the pressure accumulation in the pressure accumulation tank 21, the exhaust pressure Pe can be maintained in a value close to the exhaust pressure upper limit value Pmax by bringing the exhaust pressure lower limit value Pmin close to the exhaust pressure upper limit value Pmax. Therefore, the pressurized gas can further quickly be accumulated in the pressure accumulation tank 21.

The exhaust pressure upper limit value Pmax may be changed according to the running state of the vehicle or the operating state of the engine 1. For example, the exhaust pressure upper limit value Pmax may be changed according to a transmission gear ratio of a transmission to which an output shaft of the engine 1 is connected. As is well known, the transmission is provided in a power transmission path between the engine 1 and a drive wheel, and the transmission can be switched among plural transmission gear ratios having different values. When the vehicle runs at an identical speed, as the transmission gear ratio of the transmission decreases, that is, as the transmission is set to a high-speed gear, a torque necessary for the engine 1 increases to reduce the rotation speed of the engine 1. Therefore, as the transmission gear ratio of the transmission decreases, it can be estimated that the amount of gas discharged from the cylinder 2 to the exhaust path 5 decreases to decrease the exhaust pressure Pe. Accordingly, as the transmission gear ratio of the transmission decreases, an engine brake effect is weakened when the exhaust shut-off valve 10 is switched to the fully-closed state, and the vehicle deceleration decreases. That is, when the transmission is set to the high-speed gear to decrease the transmission gear ratio, compared with the case in which the transmission is set to a low-speed gear to increase the transmission gear ratio, the rapid reduction of the rotation speed of the engine is hardly generated to hardly generate the rapid deceleration of the vehicle even if the exhaust pressure upper limit value Pmax is increased. Therefore, as the transmission gear ratio of the transmission decreases, in other words, as the transmission is set to the high-speed gear, the exhaust pressure upper limit value Pmax is set to a higher value.

Figure 6:
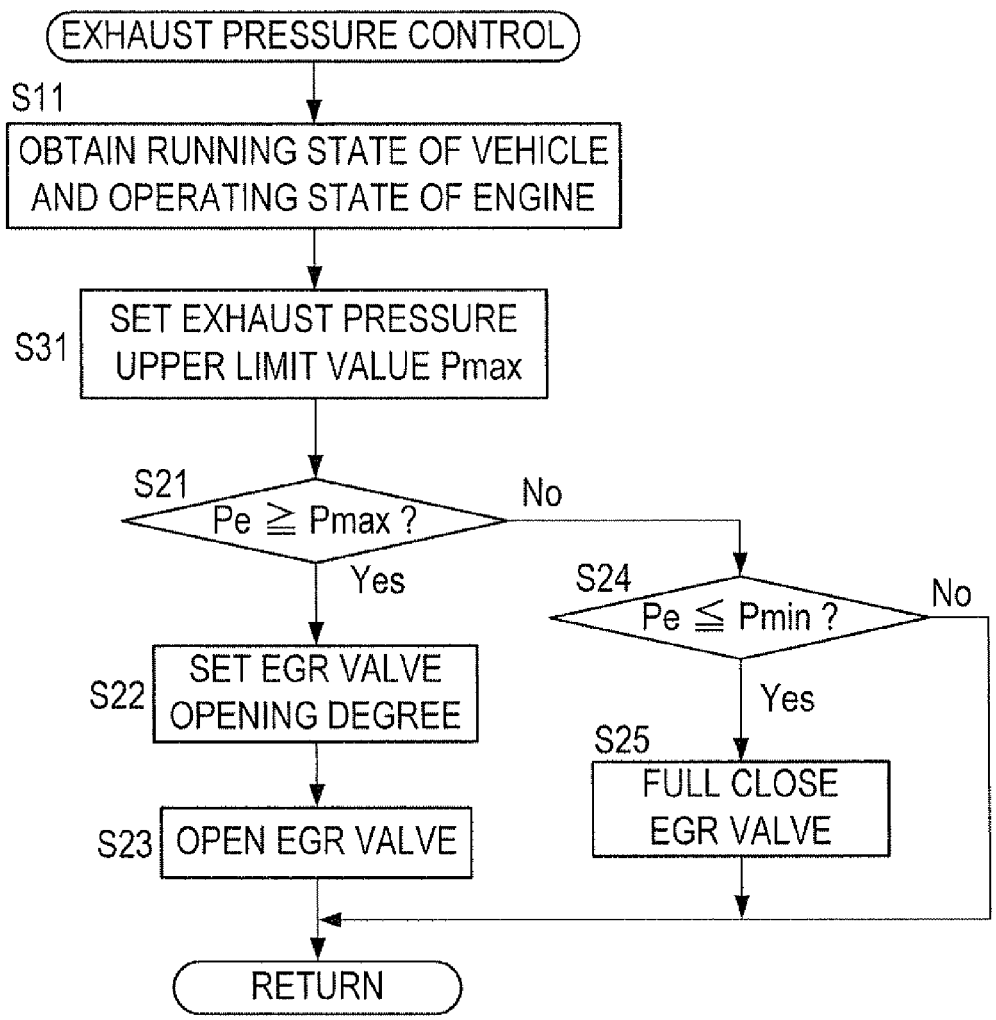
FIG. 6 is a flowchart showing a variation of the exhaust pressure control routine.

FIG. 6 is a flowchart showing an exhaust pressure control routine in which the exhaust pressure upper limit value Pmax is changed according to the transmission gear ratio of the transmission. The same processes in FIG. 6 as those in FIG. 3 have same reference numeral, and their description will be omitted. In the control routine of FIG. 6, the ECU 30 first obtains the running state of the vehicle and the operating state of the engine 1 in Step S11. At this point, the ECU 30 also obtains a gear step of the transmission, that is, the transmission gear ratio as the running state of the vehicle. In next Step S31, the ECU 30 sets the exhaust pressure upper limit value Pmax based on the obtained gear step. For example, the setting of the exhaust pressure upper limit value Pmax may be performed by referring to a map that is shown in FIG. 7. FIG. 7 shows an example of relations between the gear step of the transmission and the exhaust pressure upper limit value Pmax. Pressures P0 to P4 of FIG. 7 are set such that a relationship of P0<P1<P2<P3<P4 holds. Therefore, the exhaust pressure upper limit value Pmax is set to a higher value as the gear step is switched to the higher-speed side. The relations may be obtained in advance through experiments or the like and stored as a map in the RCM of the ECU 30. By executing Step S31, the ECU 30 functions as an upper limit value setting device of the present invention. After the setting of the exhaust pressure upper limit value Pmax, the ECU 30 goes to Step S21 and processes in a similar manner in FIG. 3.

According to the exhaust pressure control routine of FIG. 6, the exhaust pressure upper limit value Pmax increases as the gear step is switched to the higher-speed side, so that the pressurized gas can quickly be accumulated in the pressure accumulation tank 21 while the rapid vehicle deceleration is prevented. The exhaust pressure upper limit value Pmax may be set according to the vehicle speed. In general, for the high vehicle speed, it can be estimated that the gear step of the transmission is switched to the high-speed side. Therefore, the exhaust pressure upper limit value Pmax may be set to a higher value with increasing vehicle speed. Even in this case, the pressurized gas can quickly be accumulated in the pressure accumulation tank 21 while the rapid vehicle deceleration is prevented.

In the pressure accumulation system 20 of the first embodiment, the valve that adjusts the exhaust pressure Pe is not limited to the EGR valve 13 during the pressure accumulation in the pressure accumulation tank 21. For example, a valve whose opening degree can change between the fully-opened position where the exhaust path 5 is fully opened and the fully-closed position where the exhaust path 5 is fully closed is provided as the exhaust pressure shut-off valve 10, and the valve may be controlled instead of the EGR valve 13 to adjust the exhaust pressure Pe. For example, a slide type electromagnetic exhaust shut-off valve is provided as the valve. In such cases, the exhaust shut-off valve 10 is controlled by the control method identical to that of the EGR valve 13. That is, the exhaust shut-off valve 10 is opened when the exhaust pressure Pe becomes the exhaust pressure upper limit value Pmax or more, and the exhaust shut-off valve 10 is fully closed when the exhaust pressure Pe becomes the exhaust pressure lower limit value Pmin or less. The exhaust shut-off valve 10 is controlled such that the variation of the exhaust pressure Pe per unit time becomes the prescribed permissible value or less. In this case, the exhaust shut-off valve 10 functions as the pressure adjustment device of the present invention.

Figure 8:
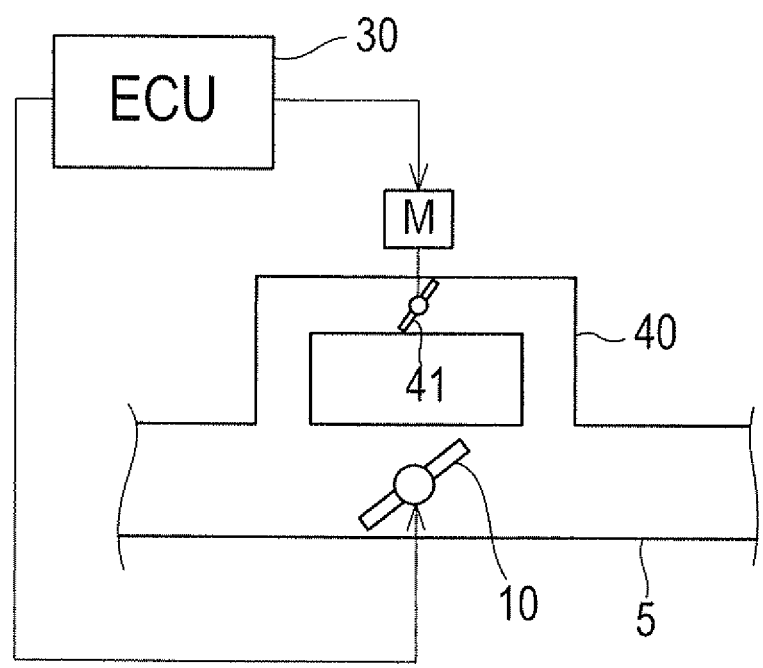
FIG. 8 is a view showing a variation of the pressure accumulation system according to the first embodiment.

Alternatively, as shown in FIG. 8, a bypass path 40 that bypasses the exhaust shut-off valve 10 and a bypass valve 41 that opens and closes the bypass path 40 are provided in the exhaust path 5, and the exhaust pressure Pe may be adjusted by controlling the bypass valve 41. FIG. 8 is an enlarge view showing the exhaust path 5 near the exhaust shut-off valve 10. In this case, a valve whose opening degree can be adjusted between the fully-opened position where the bypass path 40 is fully opened and the fully-closed position where the bypass path 40 is fully closed is provided in the bypass valve 41. Similarly to the EGR valve 13 and the exhaust shut-off valve 10, the bypass valve 41 is opened when the exhaust pressure Pe becomes the exhaust pressure upper limit value Pmax or more, and the bypass valve 41 is fully closed when the exhaust pressure Pe becomes the exhaust pressure lower limit value Pmin or less. The bypass valve 41 is controlled such that the variation of the exhaust pressure Pe per unit time becomes the prescribed permissible value or less. In such cases, the bypass valve 41 functions as the pressure adjustment device of the present invention.

When the exhaust pressure Pe is controlled by the exhaust shut-off valve 10 or the bypass valve 41, because the pressure decreases on the downstream side of the turbine 7b, the exhaust pressure hardly decreases on the upstream side of the turbine 7b. That is, the pressure can increase in the exhaust path 5 on the upstream side of the turbine 7b. Therefore, for example, when the vehicle is re-accelerated immediately after the pressure accumulation in the pressure accumulation tank 21, the rotation of the turbine 7b can quickly increase. The exhaust pressure Pe may be adjusted using the EGR valve 13, the exhaust shut-off valve 10, and the bypass valve 41 or the exhaust pressure Pe may be adjusted using a combination of two of the EGR valve 13, the exhaust shut-off valve 10, and the bypass valve 41.

The method for controlling the EGR valve 13 is not limited to the above-described control method. For example, the EGR valve 13 may be opened to a predetermined fixed opening degree when the exhaust pressure Pe reaches the exhaust pressure upper limit value Pmax. In such cases, the processing in Step S22 of FIG. 3 can be eliminated. At this point, the period during which the EGR valve 13 is maintained in the opened state may be a predetermined fixed time. In such cases, the EGR valve 13 is switched to the fully-closed position when the fixed time elapses. Even if the EGR valve 13 is controlled in the above-described way, the exhaust pressure Pe can be restricted to the exhaust pressure upper limit value Pmax or less during the pressure accumulation in the pressure accumulation tank 21. The exhaust shut-off valve 10 and the bypass valve 41 may be controlled by the similar control method.

Based on the exhaust pressure Pe, feedback control may be performed to the opening degree of the EGR valve 13 when the exhaust pressure Pe decreases. For example, the EGR valve 13 may be controlled such that the EGR valve 13 is gradually closed according to the decrease in the exhaust pressure Pe. Thus, because the decrease in the exhaust pressure Pe can be controlled by gradually controlling the EGR valve 13 to the closed side, the pressurized gas can quickly be accumulated in the pressure accumulation tank 21. The exhaust shut-off valve 10 and the bypass valve 41 may be controlled by the similar control method.

(Second Embodiment)

Figure 9:
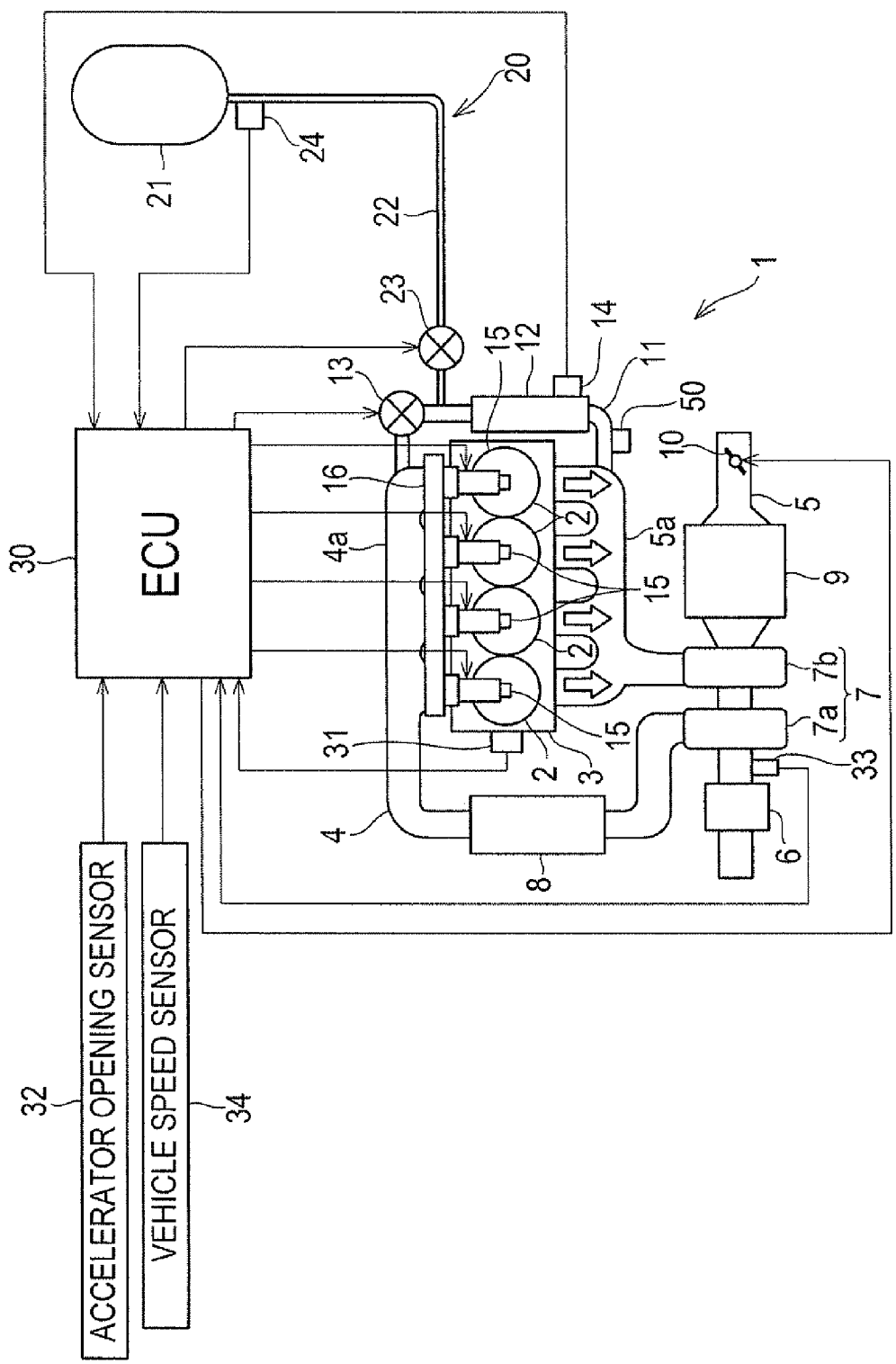
FIG. 9 is a view showing an internal combustion engine in which a pressure accumulation system according to a second embodiment of the present invention is incorporated.

FIG. 9 shows an internal combustion engine in which a pressure accumulation system according to a second embodiment of the present invention is incorporated. In FIG. 9, the same component as that in the first embodiment is denoted by the same reference numeral, and the description thereof will be omitted. As shown in FIG. 9, the second embodiment differs from the first embodiment in that a check valve 50 is provided as a relief valve in the EGR path 11. Other components are same as those in the first embodiment. The check valve 50 is configured to be opened to discharge the gas in the EGR path 11 to the outside when the exhaust pressure Pe reaches the exhaust pressure upper limit value Pmax.

According to the pressure accumulation system of the second embodiment, the check valve 50 is opened when the exhaust pressure Pe reaches the exhaust pressure upper limit value Pmax, so that the gas can be discharged to the outside from the exhaust path 5 on the upstream side of the exhaust shut-off valve 10. Therefore, because the exhaust pressure Pe can decrease, the excessively high exhaust pressure Pe can be prevented during the pressure accumulation in the pressure accumulation tank 21. The tank pressure becomes approximately equal to the exhaust pressure Pe during the pressure accumulation in the pressure accumulation tank 21. Therefore, the check valve 50 may be configured to be opened when the tank pressure reaches the exhaust pressure upper limit value Pmax.

The present invention is not limited to the above-described embodiments, and may be embodied in various form. For example, the pressure accumulation system of the present invention may be applied to not only the Diesel engine but also various internal combustion engines utilizing gasoline or other fuel. The gas mainly accumulated in the pressure accumulation tank is not limited to the air. The exhaust gas may be accumulated in the pressure accumulation tank.

The pressure in the exhaust path on the upstream side of the exhaust shut-off valve may be estimated based on the elapsed time since the exhaust shut-off valve and the EGR valve are fully closed, the engine rotation speed, and the intake air amount of the engine. In such cases, the ECU corresponds to the pressure obtaining device of the present invention. When the gas is accumulated in the pressure accumulation tank, the pressure in the pressure accumulation tank is correlated with the pressure in the exhaust path on the upstream side of the exhaust shut-off valve. Therefore, the operations of the EGR valve, exhaust shut-off valve, and the like are controlled based on the output signal of the pressure sensor that outputs the signal corresponding to the pressure in the pressure accumulation tank, whereby the exhaust pressure may be restricted to the exhaust pressure upper limit value or less. In such cases, the pressure sensor corresponds to the pressure obtaining device of the present invention. Alternatively, the exhaust pressure or the tank pressure is estimated based on various physical quantities that are correlated with the pressure in the exhaust path at the time the gas is accumulated in the pressure accumulation tank, and the operations of the EGR valve, exhaust shut-off valve, and the like may be controlled based on the estimated exhaust pressure or tank pressure. That is, the operations of the EGR valve, exhaust shut-off valve, and the like during the pressure accumulation in the pressure accumulation tank may be controlled based on various physical quantities that are correlated with the pressure in the exhaust path at that time.

An adsorbent that can adsorb the gas and emit the adsorbed gas may be accommodated in the pressure accumulation tank. Examples of the adsorbent include activated coal, zeolite, alumina, and carbon molecular sieve. The adsorbent is not limited to a single material, but a mixed adsorbent material may be used as the adsorbent.

The invention claimed is:

1. A pressure accumulation system, which is applied to an internal combustion engine in which an exhaust shut-off valve is provided in an exhaust path, the exhaust shut-off valve being able to switch between a fully-closed position where the exhaust path is closed and a fully-opened position where the exhaust path is opened, the pressure accumulation system comprising:
   a pressure accumulation container in which a pressurized gas can be accumulated, the pressure accumulation container being configured to introduce gas from the exhaust path on an upstream side of the exhaust shut-off valve, the pressure accumulation container being configured to supply the gas to the exhaust path on the upstream side of the exhaust shut-off valve, the pressurized gas being accumulated in the pressure accumulation container by increasing a pressure in the exhaust path on the upstream side of the exhaust shut-off valve;
   a pressure value obtaining device configured to obtain a pressure value in the exhaust path on the upstream side of the exhaust shut-off valve or a pressure value in the pressure accumulation container;
   a pressure adjustment device configured to adjust the pressure value in the exhaust path on the upstream side of the exhaust shut-off valve; and
   a control device for controlling an operation of the pressure adjustment device based on the pressure value obtained by the pressure value obtaining device such that the pressure value in the exhaust path on the upstream side of the exhaust shut-off valve is restricted to a prescribed exhaust pressure upper limit value or less when the gas is accumulated in the pressure accumulation container, wherein
   the control device first increases the pressure value in the exhaust path on the upstream side of the exhaust shut-off valve to the exhaust pressure upper limit value when the gas is accumulated in the pressure accumulation container, and the control device controls the operation of the pressure adjustment device such that the pressure value in the exhaust path on the upstream side of the exhaust shut-off valve changes within a prescribed pressure range whose upper limit value is the exhaust pressure upper limit value, the gas is accumulated in the pressure accumulation container until a pressure in the pressure accumulation container reaches a prescribed target pressure, and a value that is lower than the exhaust pressure upper limit value and is greater than or equal to the target pressure is set to a lower limit value of the prescribed pressure range.

2. The pressure accumulation system according to claim 1, wherein, when the pressure value in the exhaust path on the upstream side of the exhaust shut-off valve is adjusted, the control device controls the operation of the pressure adjustment device such that a variation of the pressure per unit time becomes a prescribed permissible value or less.

3. The pressure accumulation system according to claim 1, wherein the internal combustion engine includes:
an exhaust gas recirculation (EGR) path that connects the exhaust path on the upstream side of the exhaust shut-off valve and an intake path of the internal combustion engine; and
an exhaust gas recirculation (EGR) valve that opens and closes the EGR path, wherein
the pressure adjustment device is the EGR valve.

4. The pressure accumulation system according to claim 3, wherein the control device gradually controls the EGR valve to a closed side according to the decrease in the pressure value obtained by the pressure value obtaining device.

5. The pressure accumulation system according to claim 1, further comprising:
a bypass path that connects the exhaust path on the upstream side of the exhaust shut-off valve and the exhaust path on the downstream side of the exhaust shut-off valve; and
a bypass valve that opens and closes the bypass path, wherein
the pressure adjustment device is the bypass valve.

6. The pressure accumulation system according to claim 5, wherein the control device gradually controls the bypass valve to a closed side according to the decrease in the pressure value obtained by the pressure value obtaining device.

7. The pressure accumulation system according to claim 1, wherein the internal combustion engine is mounted on a vehicle,
a transmission that is provided in a power transmission path between the internal combustion engine and a drive wheel of the vehicle is connected to an output shaft of the internal combustion engine, the transmission being able to switch among a plurality of transmission gear ratios having different values, and
the control device includes upper limit value setting device for setting the exhaust pressure upper limit value to a higher value as a speed of the vehicle increases or as the transmission gear ratio decreases in the transmission.

8. A pressure accumulation system, which is applied to an internal combustion engine in which an exhaust shut-off valve is provided in an exhaust path, the exhaust shut-off valve being able to switch between a fully-closed position where the exhaust path is closed and a fully-opened position where the exhaust path is opened, an opening degree of the exhaust shut-off valve can change between the fully-closed position and the fully-opened position, the pressure accumulation system comprising:

a pressure accumulation container in which a pressurized gas can be accumulated, the pressure accumulation container being configured to introduce gas from the exhaust path on an upstream side of the exhaust shut-off valve, the pressure accumulation container being configured to supply the gas to the exhaust path on the upstream side of the exhaust shut-off valve, the pressurized gas being accumulated in the pressure accumulation container by increasing a pressure in the exhaust path on the upstream side of the exhaust shut-off valve;

a pressure value obtaining device configured to obtain a pressure value in the exhaust path on the upstream side of the exhaust shut-off valve or a pressure value in the pressure accumulation container;

a pressure adjustment configured to adjust the pressure value in the exhaust path on the upstream side of the exhaust shut-off valve; and a control device for controlling the opening degree of the exhaust shut-off valve based on the pressure value obtained by the pressure value obtaining device such that the pressure value in the exhaust path on the upstream side of the exhaust shut-off valve is restricted to a prescribed exhaust pressure upper limit value or less when the gas is accumulated in the pressure accumulation container, wherein the control device first increases the pressure value in the exhaust path on the upstream side of the exhaust shut-off valve to the exhaust pressure upper limit value when the gas is accumulated in the pressure accumulation container, and the control device controls the opening degree of the exhaust shut-off valve such that the pressure value in the exhaust path on the upstream side of the exhaust shut-off valve changes within a prescribed pressure range whose upper limit value is the exhaust pressure upper limit value, the gas is accumulated in the pressure accumulation container until a pressure in the pressure accumulation container reaches a prescribed target pressure, and a value that is lower than the exhaust pressure upper limit value and is greater than or equal to the target pressure is set to a lower limit value of the prescribed pressure range.

9. The pressure accumulation system according to claim 8, wherein
the control device gradually controls the exhaust shut-off valve to a closed side according to the decrease in the pressure value obtained by the pressure value obtaining device.

* * * * *